Patented Nov. 14, 1933

1,935,411

UNITED STATES PATENT OFFICE 1,935,411

PROCESS FOR THE MANUFACTURE OF COMPOSITIONS CAPABLE OF BEING MOLDED

Fritz Pollak and Wilhelm Kraus, Vienna, Austria, assignors, by mesne assignments, to Synthetic Plastics Company, Incorporated, New York, N. Y., a corporation of Delaware No Drawing. Application September 15, 1927, Serial No. 219,808, and in Austria May 31, 1927. Renewed December 7, 1931

20 Claims. (Cl. 260—3)

This invention relates to processes for the manufacture of compositions from the products produced by the condensation of urea, thiourea or derivatives of amides of carbonic acid (hereinafter included in the expression "a urea") with aldehydes or their polymers, particularly formaldehyde, which compositions can be easily molded by the use of heat and pressure into glass-clear, homogeneous shaped articles.

An object of this invention is to produce such compositions of desirable character in the respect of durability, homogeneity and clearness of molded products and of practicability and economy of suitable molding conditions therefor.

As the result of exhaustive investigations it has been recently found that the presence of the large quantities of formaldehyde which become liberated causes flaws and cracks which arise when the pressed articles swell and subsequently shrink. The formaldehyde which is evolved during the heating of the product while it is in the mold has a solvent action on the condensation products and causes them to swell up and therefore prevents the uniform formation of the final condensation product. It is obvious that a state of equilibrium is produced between the masses to be polymerized on the one hand and the formaldehyde which can be split off and the polymerized masses on the other hand, which is displaced by the presence of free formaldehyde to the detriment of the latter. This vagabond or wandering formaldehyde makes its disturbing influence felt also in the finished products in the manner hereinbefore referred to and causes the formation of flaws and cracks.

On the other hand it has been found that the reason for the difficulties in connection with the technique of the molding itself of the products must be looked for in the high degree of polymerization which the heretofore known press compositions and powder possess prior to molding. The investigations which have been instituted in this direction have yielded the following results:

If a jelly be prepared in any way from the condensation solution, two phases can be differentiated in the main during the transition of the fresh jelly to the hard final state. In the first phase it is mainly only the water which is physically combined with the cellular jelly, i. e. the water which surrounds each of the cells, which disappears gradually, the gel particles moving nearer towards each other and the gel dries up. In this state the dried up gel is still capable of swelling up and can easily be molded as, owing to the low degree of polymerization, it possesses a very high plasticity. If the dried up gel, freed that is to say from the major portion of the water physically combined with it, be further heated, the water which is chemically combined in each of the gel particles also disappears, the particles combine in a still closer union, splitting off water and formaldehyde in the process, and the polymerized, solid final product is obtained. In this state the compositions possess a very low plasticity and are therefore difficult to mold.

As the result of the above mentioned investigations it has been found that improved products can be obtained in a simple manner by molding, if there are used comminuted urea-formaldehyde condensation products which are still capable of swelling up and contain a minimum amount of formaldehyde that can be split off.

To produce the comminuted condensation products in a state in which they will swell up, any suitable method may be used. With the aid of the knowledge above referred to all those processes which have hitherto been known may be used for the purposes of this invention provided that care be taken that all conditions which might bring about premature polymerization during the drying up of the gel be eliminated.

A high degree of polymerization of the molding powders may be caused by the use of relatively large quantities of acids added to the condensation solution for the purpose of bringing about the flocculent precipitation of the powder. A product gelatinized with large quantities of acids will when dried with heretofore usual methods be so extensively polymerized, even during the drying thereof at low temperatures, that almost the final hardened state will be attained. A powder of this kind therefore cannot be used for molding purposes at commonly used pressures and temperatures.

In general the production of products of a low degree of polymerization is carried out by conducting the condensation with the smallest possible quantities of those substances added to accelerate gelatinization (such as acids or acid salts) and by removing the water from the mass gelatinized at low temperatures under such conditions (drying in vacuo for example if the mass be of large superficial area) that polymerization is restrained. It is therefore advantageous to comminute the compositions even before or during drying.

According to one particular method of carrying out the present invention, products of a low degree of polymerization are produced by allowing the condensation solution to gelatinize whilst being subjected to the finest possible mechanical subdivision, after which the powder is dried until the physically combined water has been expelled, polymerization being however retarded meanwhile. This may be conveniently carried out by spraying the condensation solution against a current of warm air. The dry powder which falls from the current of air can be molded at once. Other methods may also of course be employed for the production of this powder and other apparatus such for example as heated rollers, vacuum drying drums and the like.

For the production of compositions which evolve no formaldehyde or the smallest possible quantity of free formaldehyde during hardening all suitable processes may be employed, provided this desired final purpose be kept in view. Suitable products are obtained if the comminuted compositions be washed with ammonia or other reagents which fix formaldehyde, prior to being molded. In many cases it is also possible wholly or partially to remove the free formaldehyde by ventilating the mold one or more times during the molding operation. The deleterious action of the free formaldehyde may also be eliminated by adding ammonium salts in a dry state to the powder to be molded. Salts may also be added which accelerate polymerization in the presence of free formaldehyde.

The powders produced according to the present invention will swell slightly in water and flow in the mold at only slightly above 100° cent. At a pressure of approximately only 150 kg. per sq. cm. they can be molded into any desired form in the hot mold and reproduce the details thereof with extraordinary faithfulness. These properties are of high technical value especially for articles which have hitherto been made from glass.

The molding of the compositions produced according to the new process is in general carried out in the usual way. The powders which will still swell slightly may also be heated for a short time at high temperatures prior to being molded. If necessary the compositions may be only partially polymerized in the mold and the process subsequently completed by further heating outside the mold. This heating may also if necessary be carried out under pressure. In this case also the special advantages of the process are manifested as it is possible to leave the powder only a short time in the mold for the purpose of molding it, so that the time during which the molds are used is very short.

If the condensation mass be mixed with filling materials such for example as fibrous materials or the like a still greater increase of the superficial area is obtained and a more rapid removal of the physically combined water thereby attained, while at the same time polymerization is retarded as much as possible. If at the same time the filling materials be so chosen that they are capable of fixing the formaldehyde which can be split off, molding compositions can be obtained which can be molded with extraordinary ease and yield products capable of answering all requirements.

The following are examples of modes of carrying out the present invention:

1. The condensation mass is dried in vacuo with or without stirring until the weight is constant at low temperatures. The mass can be pressed at once.

2. 100 kg. of the condensation mass are treated, in order to remove both the free formaldehyde and that which can be split off, with about 10 kg. of concentrated ammonia until the reaction is faintly alkaline, then washed with water to remove the hexamethylenetetramine formed and dried in the same way as in Example 1.

3. The condensation mass is carefully gelatinized by heating it to 60° with all the water and then worked up into a fine powder by squeezing, rolling and similar processes, the powder being dried as in Examples 1 and 2 and at the lowest possible temperature.

4. A condensation solution is sprayed with spraying appliances against a current of warm air. The fine drops dry very rapidly owing to their great superficial area. The powder which falls out can be pressed at once.

5. The press powders produced according to the above examples have about 0.5% to 2% of ammonium sulphate added to them for the purpose of accelerating polymerization in the press.

We claim:

1. A process for the production of compositions from a condensation product of a urea with an aldehyde comprising condensing said urea and aldehyde in the presence of the least possible amount of polymerization accelerating material of acid character capable of effecting the polymerization, gelatinizing said condensation product at approximately 60° C., freeing the same from water while at a low temperature whereby further polymerization will be temporarily halted, and reducing the product to a pulverulent state, whereby the product which is only slightly polymerized and therefore still capable of swelling may be molded into homogeneous products by the application of heat and pressure.

2. A process of forming condensation products of a urea and an aldehyde in which the condensation solution is gelatinized and comminuted by spraying against a stream of warm air.

3. A process as in claim 1 in which the condensation solution is gelatinized and then comminuted under vacuum.

4. A process as in claim 1 in which a substance capable of binding any free formaldehyde is mixed with the condensation product.

5. A material from the condensation product of a urea and an aldehyde which is slightly polymerized and capable of slight swelling, and which contains only a minimum quantity of free formaldehyde.

6. In the manufacture of a condensation product of an aldehyde and a urea, the herein described process which comprises carrying out the gelatinization step in the presence of a minimum amount of acid substance as condensing agent, removing the water from the gelatinized material at a very low temperature and while in a subdivided condition, whereby a mass readily moldable at a temperature of only slightly above 100° C. and at a pressure of approximately 150 kg. per sq. cm. is produced.

7. In the manufacture of a condensation product of an aldehyde and a urea, the steps which comprise condensing an aldehyde and a urea in the presence of a solvent, and in the presence of such an amount of polymerization accelerating material as will not cause a material amount of polymerization during a subsequent spraying operation, and spraying the solution of the condensation product to quickly evaporate off the solvent, whereby a solid product is obtained which is capable of molding readily at a pressure of approximately 150 kg. per sq. cm.

8. In the manufacture of a condensation product of an aldehyde and a urea, the steps which comprise condensing formaldehyde and urea in the presence of water, and in the presence of such an amount of polymerization accelerating material as will not cause a material amount of polymerization during a subsequent spraying operation, and spraying the solution of the condensation product to quickly evaporate off the water, whereby a solid product is obtained which is capable of molding readily at a pressure of approximately 150 kg. per sq. cm.

9. In the manufacture of a condensation product of an aldehyde and a urea, the step which comprises spraying a solution of the condensation product to quickly evaporate off the solvent, whereby a solid product is obtained which is moldable at a pressure of approximately 150 kg. per sq. cm.

10. In the manufacture of a condensation product of an aldehyde and a urea, the step which comprises spraying an aqueous solution of the condensation product to quickly evaporate off the water, whereby a solid product is obtained which is moldable at a pressure of approximately 150 kg. sq. cm.

11. In the manufacture of a condensation product of an aldehyde and a urea, the step which comprises spraying a solution of the condensation product of the said aldehyde and urea against a current of warm air, whereby the solvent is evaporated and a product obtained which is moldable at a pressure of approximately 150 kg. per sq. cm.

12. In the manufacture of a condensation product of an aldehyde and a urea, the step which comprises spraying a solution of the condensation product of the said aldehyde and urea against a current of warm air, whereby the water is evaporated and a product obtained which is moldable at a pressure of approximately 150 kg. per sq. cm.

13. In the manufacture of a condensation product of an aldehyde and a urea, the step which comprises spraying a solution of the said aldehyde and urea condensation product in which condensation of the said aldehyde and urea is very slight, against a current of warm air, whereby the solvent is evaporated and a product obtained which swells under the influence of heat in a mold.

14. In the manufacture of a condensation product of an aldehyde and a urea, the step which comprises spraying a solution of the said aldehyde and urea condensation product in which condensation of the said aldehyde and urea is very slight, against a current of warm air, whereby the water is evaporated and a product obtained which swells under the influence of heat in a mold.

15. In the manufacture of a condensation product of an aldehyde and a urea, the step which comprises spraying a solution of the condensation product of the said aldehyde and urea into warm air, whereby the solvent is evaporated and a product obtained which is moldable at a pressure of approximately 150 kg. per sq. cm.

16. In the manufacture of a condensation product of an aldehyde and a urea, the step which comprises spraying a solution of the condensation product of the said aldehyde and urea into warm air, whereby the water is evaporated and a product obtained which is moldable at a pressure of approximately 150 kg. per sq. cm.

17. In the manufacture of a condensation product of an aldehyde and a urea, the step which comprises spraying a solution of the condensation product to quickly evaporate off the solvent.

18. In the manufacture of a condensation product of an aldehyde and a urea, the step which comprises spraying an aqueous solution of the condensation product to quickly evaporate off the water.

19. In the manufacture of a condensation product of an aldehyde and a urea, the step which comprises spraying a solution of the condensation product of the said aldehyde and urea against a current of warm air to quickly evaporate off the water.

20. In the manufacture of a condensation product of an aldehyde and a urea, the step which comprises spraying a solution of the condensation product of the said aldehyde and urea into warm air to quickly evaporate off the solvent.

FRITZ POLLAK.
WILHELM KRAUS.